United States Patent [19]

Young

[11] 3,765,443

[45] Oct. 16, 1973

[54] VELOCITY SENSITIVE SAFETY VALVE MECHANISM

[75] Inventor: David E. Young, Houston, Tex.

[73] Assignee: Schlumberger Technology Corp., New York, N.Y.

[22] Filed: June 21, 1971

[21] Appl. No.: 155,072

[52] U.S. Cl................. 137/460, 137/463, 137/498, 166/224
[51] Int. Cl............................................ F16k 17/24
[58] Field of Search.................... 137/458, 459, 460, 137/463, 464, 498; 166/224

[56] References Cited
UNITED STATES PATENTS

| | | | |
|---|---|---|---|
| 3,398,762 | 8/1968 | Fredd | 137/498 X |
| 3,543,793 | 12/1970 | Dollison | 166/224 X |
| 3,126,908 | 7/1964 | Dickens | 137/460 |
| 3,070,119 | 12/1962 | Baulins | 137/460 |
| 2,327,055 | 8/1943 | McMahon | 137/458 |
| 3,279,545 | 10/1966 | Page | 137/498 X |

Primary Examiner—Harold W. Weakley
Attorney—Tom Arnold et al.

[57] ABSTRACT

A velocity sensitive safety valve mechanism, according to the present invention, may include a ball valve assembly that is rotated between open and closed positions to control the flow of production fluid responsive to velocity and pressure conditions of the production fluid. For the purpose of controlling opening and closing of the safety valve mechanism a valve actuator sleeve is provided that supports the valve ball for rotation and is biased toward a position achieving closure of the ball element. Latching means is provided to restrain the actuating sleeve in a position causing the ball or valve element to be maintained in the open position thereof. Means may be provided to function, responsive to a predetermined pressure drop within the conduit upstream of the safety valve mechanism to unlatch the actuator locking mechanism when the flow of production fluid reaches a predetermined maximum limit. Unlatching of the actuator locking mechanism allows the valve element to be biased to its closed position ceasing the flow of production fluid. Opening of the safety valve mechanism and resetting of the unlatching mechanism may be achieved simply by introducing sufficient pressure into the production conduit, above or downstream of the safety valve, to exceed reservoir or casing pressure externally of the safety valve mechanism.

19 Claims, 11 Drawing Figures

PATENTED OCT 16 1973

David E. Young
INVENTOR

BY
Arnold, White & Durkee
ATTORNEYS

David E. Young
INVENTOR

BY
Arnold, White & Durkee
ATTORNEYS

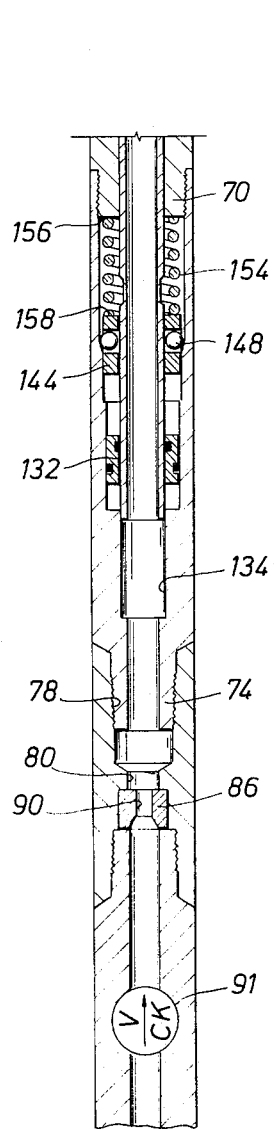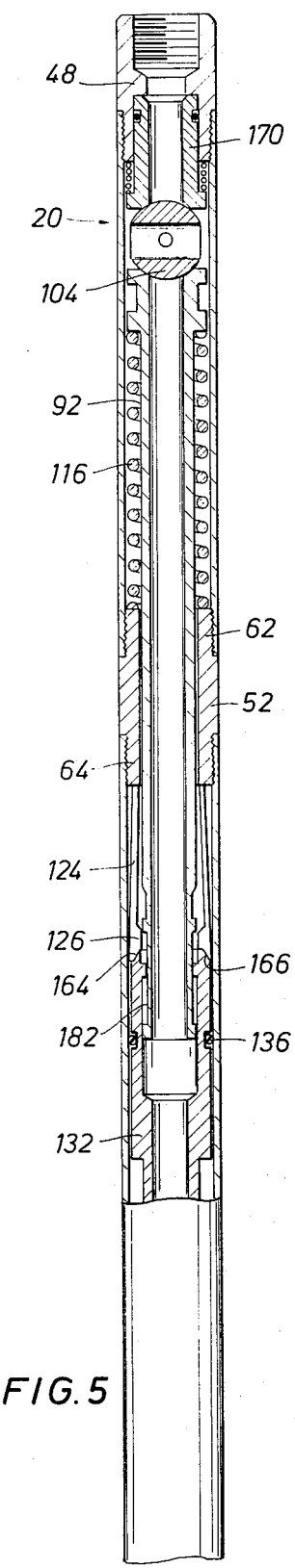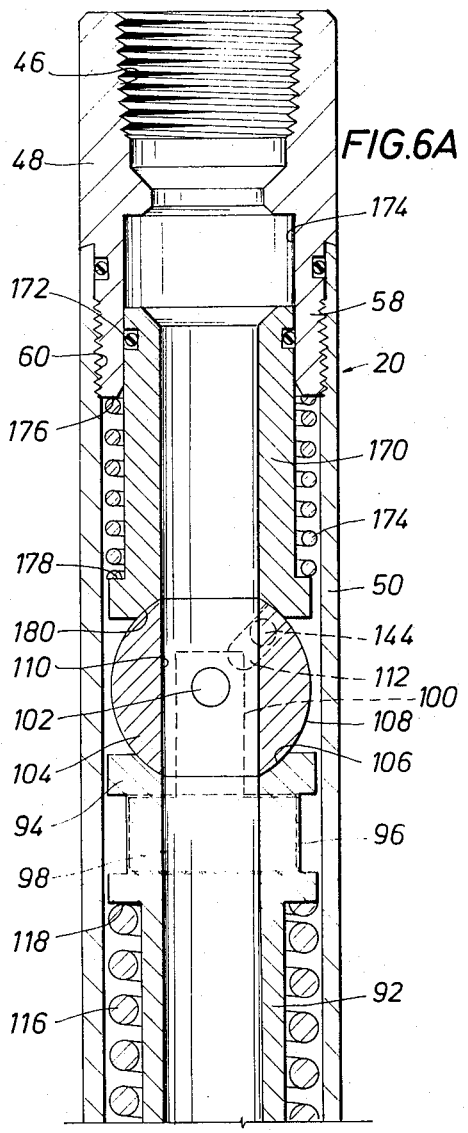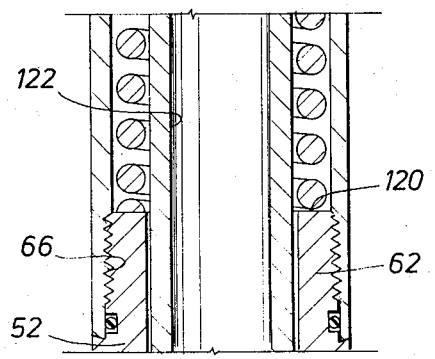

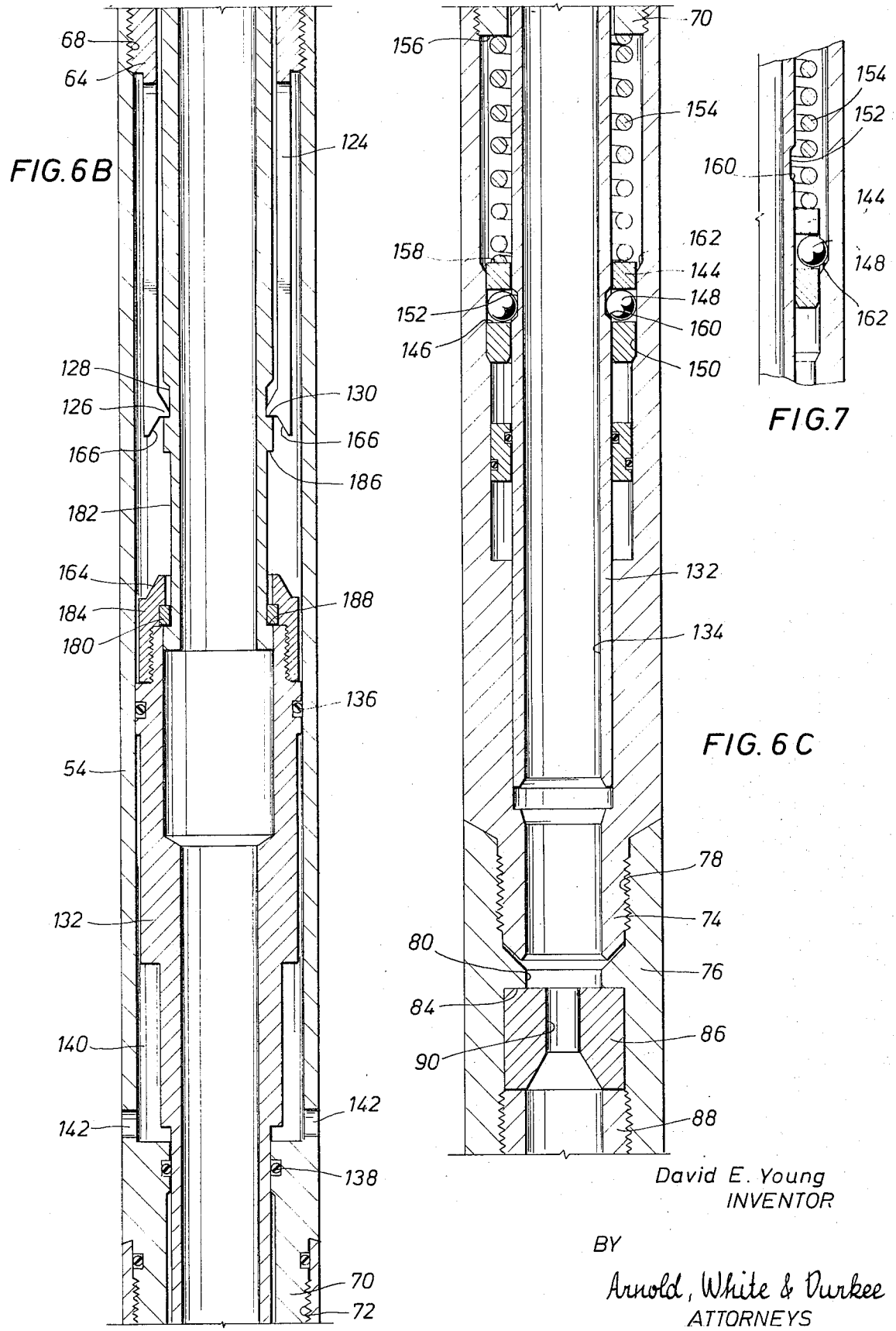

VELOCITY SENSITIVE SAFETY VALVE MECHANISM

FIELD OF THE INVENTION

The present invention relates generally to safety valves and more particularly to a velocity sensitive safety valve mechanism that is operative to allow the flow of production fluid below a predetermined velocity and to completely shut ofr the flow of production fluid in the event such flow should increase above a predetermined allowable velocity.

BACKGROUND OF THE INVENTION

In the eary stages of development of the petroleum industry it was typically the practice to tap a pressurzied source or reservoir of petroleum products by drilling and to allow any gas pressure that might be contained therein to dissipate to a controllable level or to a level at which the petroleum products might be recovered by pumping. The gas during this particular period was substantially unusable and was generally wasted. Where oil was blown from the well along with the escaping gas, it was the practice to collect the oil in surface ditches constructed about the well site. As the petroleum industry rapidly developed, it was discovered that the pressurized gas within production formations could be efficiently utilized to produce other petroleum products contained therein and the gas itself could be efficiently marketed in its natural state or in other physical states, such as the liquid state, for example. Various deveopments have been made to ensure against the loss of gas pressure within petroleum reservoirs, but most of the eary developments were related to surface control valves and the like that might be manipulated manually or mechanically for flow control purposes.

Although well may now be effectively controlled to prevent unnecessary escape of gas from the reservoir, occasionally an unforseen circumstance will develop that may cause a well to blow wild. Surface production control equipment may be damaged by mechanical apparatus operating in the vicinity of the well site and the surface equipment of the well may be otherwise subject to various hazards of the surface environment that could result in blot-out of the well.

When the well is being produced through an offshore facility such as a production platform, the occurrence of an explosion or fire and the like is extremely hazardous to lives of personnel because of the difficulty of escape from the production facility. Offshore explosions and fires are also extremely expensive from a property damage standpoint because of the extremely expensive nature of offshore production facilities. Moreover, an oil spill that might be caused by damage to surface production flow control equipment, located on an offshore production facility, may result in pollution of an extremely large area of the shoreline thereby resulting in extensive damage to wildlife sanctuaries and the like.

Explosions, but at surface blow control equipment and within the well bore below the surface equipment, may result in sufficient damage to allow a particular well to blow wild.

Wells may also blow-out due to shifting of earth stratum through which the well bore passes and likewise, may blow-out due to insufficient structural interconnection between well cement within the well bore and the earth stratum through which the well bore passes thereby allowing pressurzied production fluid to flow around the exterior of the well casing to the surface.

When a well blows wild for any reason whatever, the expense thereof to well drilling and producing companies can be extremely great. Such expense may be caused by loss of production during the time the well is blowing wild and due to the loss of field reservoir pressure which may prevent future production of petroleum products in situ. Loss of reservoir pressure may also substantially slow the production of petroleum products or may make the production of such products extremely expensive by requiring gas lifting operations and secondary recovery operations for effective production.

It is obviously necessary to provide subsurface production flow control mechanisms that may e controllable automatically or selectively as desired to prevent well blow-outs even though surface flow control equipment may be damaged or rendered inoperative. Subsurface production flow control apparatus of this nature may be capable of preventing explosion and fires that otherwise might occur in the event of damage or malfunction of surface flow control systems. Moreover, subsurface flow control safety equipment may effectively prevent the pollution of the surface environment that might otherwise occur if an offshore well is allowed to blow wild. Since subsurface safety valve mechanisms may effectively present a great majority of well blow-outs and since pollution control is so extremely important from the standpoint of conservation, it is obvious that subsurface safety mechanisms are necessary to efficient functioning of the petroleum industry.

THE PRIOR ART

Various well safety systems have beendeveloped involving both surface and subsurface safety equipment that may be actuated to a safe position either automatically as by pilot mechanisms which may be controlled by remote sensing or in the alternative may be actuated selectively or automatically, in response to the development of an adverse well condition, to stop the flow of production fluid until the production equipment may be made safe for further operation.

Offshore wells may include production equipment provided with a "safe mode" that may allow production or may shut-in the well in the event of storms or other hazardous conditions that might otherwise adversely affect production operations Surface and subsurface safety valve equipment has been developed that effectively achieves shut-in of surface or subsurface production flow control equipment to terminate the flow of production fluid in the event excessive well pressures should develop and in the event the flow control equipment should be subjected to excessive flow of production fluid.

Accordingly, it is a primary object of the present invention to provide a novel velocity sensitive safety valve mechanism that is capable of functioning properly in a down-hole well environment to shut off the flow of production fluid in the event the velocity of such flow should increase above a predetermined maximum operating level.

It is another object of the present invention to provide a novel velocity sensitive safety valve mechanism that may be employed in tandem with a low flow type safety valve mechanism to provide full range flow protection for a down-hole well environment.

It is also an object of the prevent invention to provide a novel velocty sensitive safety valve mechanism that may be simply and effectively tested to insure proper operation thereof without necessitating expensive testing operations such as the pulling of production tubing, the provision of special testing equipment, or removal of the safety valve mechanism from the tubing string.

Among the several objects of the present invention is noted the contemplation of a novel velocity sensitive safety valve mechanism that may be reopened for further production of fluid through the conduit structure with which it may be associated after having been closed simply by increasing pressure within the production conduit downstream of the safety valve mechanism to a pressure in excess of revervoir pressure upstream of the safety valve mechanism.

It is another feature of the present invention to provide a novel velocity sensitive safety valve mechanism adapted for a down-hole environment that may be implaced and removed by simply employing conventional wire-line equipment, thereby providing for simple and inexpensive servicing in the event such should be indicated necessary by a testing procedure.

Among the several objects of the present invention is noted the contemplation of a novel velocity sensitive safety valve mechanism that is actuated for closure of a valve responsive to excessive flow of production fluid, but does not depend upon high velocity flowing fluid to achieve forcible closure of the valve structure.

An even further object of the present invention involves the provision of a novel velocity sensitive safety valve mechanism that is capable of anticipating a condition developing high velocity flow to achieve shut off of a safety valve mechanism before full high velocity flow can develop.

Still another feature of the present invention includes the provision of a novel velocity sensitive safety valve mechanism for a down-hole environment that is simple in nature, reliable in use and low in cost.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise an elongated generally tubular housing that is adapted for connection into a string of production tubing or for connection to a conventional wire-line production tool that is received by a conventional landing nipple in the tubing string. The tubular housing may receive an elongated valve actuating sleeve supporting a rotatable valve ball element that is movable between open and closed positions responsive to linear movement of the valve actuating sleeve. The valve actuating sleeve may be biased, by a compression spring or by any other suitable biasing means, toward a position achieving closure of the valve ball. The safety valve mechanism may also include a latching mechanism, disposed for latching engagement with the valve actuating sleeve and serving to lock the valve actuating sleeve in a position maintaining the valve ball in the open position thereof.

The safety valve mechanism may also include a latch releasing piston that is normally maintained in an inoperative position by a biasing means and is movable against the biasing means to a position achieving release of the latch releasing piston from restraint by the biasing means. Upon being so released, the latch released piston will be driven by a resultant force developed by pressure differential interiorly and exteriorly of the safety valve mechanism and will engage and release the latching mechanism, thereby allowing the valve actuating sleeve to be moved by its biasing means to achieve closure of the ball valve.

Differential pressure for actuation of the latch releasing piston is developed by fluid flowing into the housing structure through a restriction, thereby causing a pressure drop across the restriction to be communicated to production flow passage structure defined in the safety valve mechanism.

The safety valve mechanism, including the latch releasing piston may bemoved to the initial "set" position thereof upon introduction of pressure into the valve mechanism downstream of the valve ball above the level of reservoir pressure existing exteriorly of the safety valve mechanism.

BRIEF DESCRIPTION OF THE DRAWING

So that the manner in which the above recited features, advantages and objects of the present invention, as well as others which will become apparent are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of the invention and are, therefore, not to be considered limiting of its scope, for the invention may admit to other equally effective embodiments.

Figure 1:
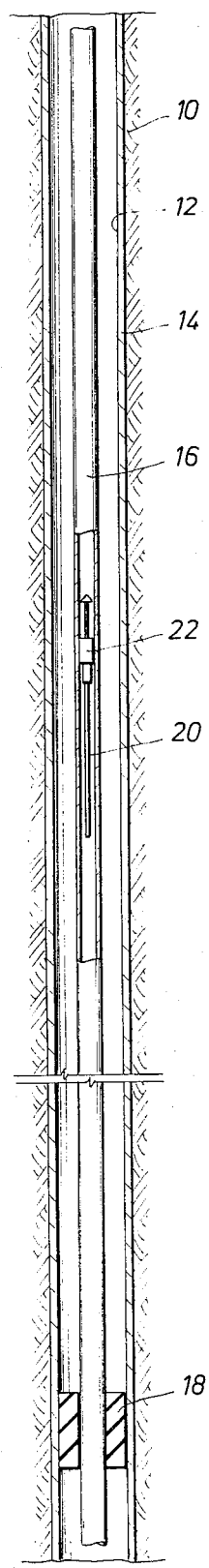

IN THE DRAWINGS:

FIG. 1 is a pictorial representation illustrated partially in section of a subsurface earth formation having a well bore extended therethrough and being lined with a well casing enclosing a production tubing containing a down-hole velocity sensitive safety valve mechanism constructed in accordance with the present invention.

Figure 2:
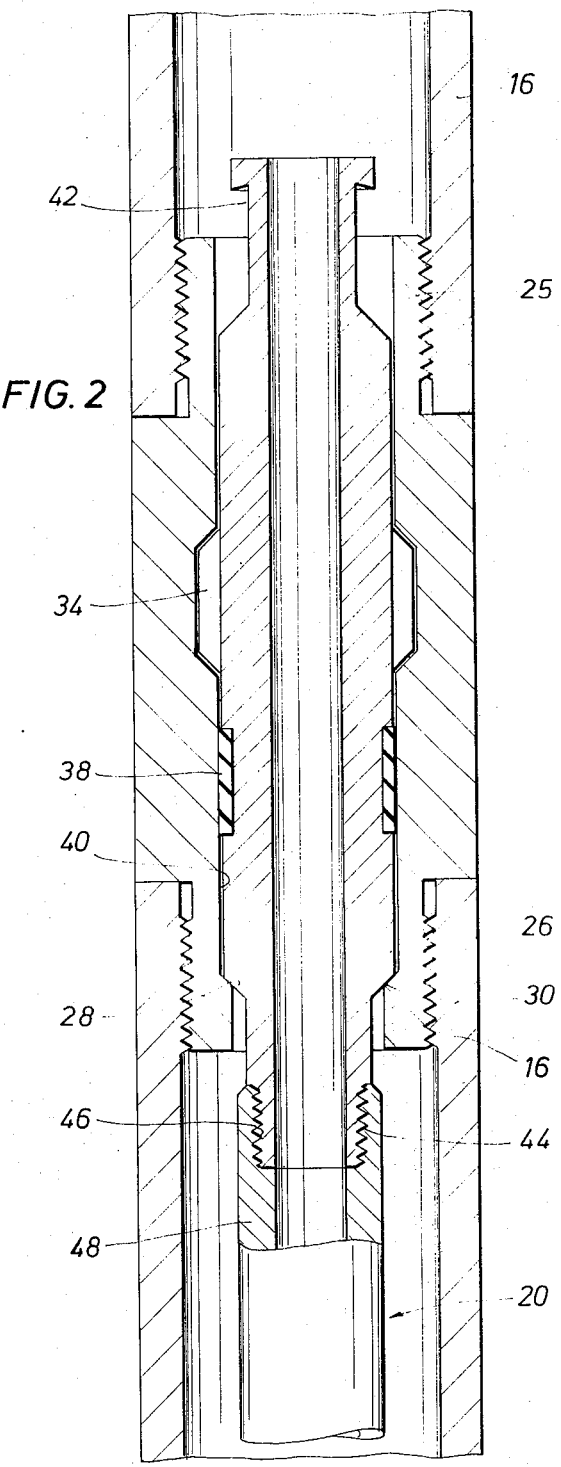

FIG. 2 is a fragmentary sectional view of the well casing structure of FIG. 1 illustrating a typical landing nipple and showing wire-line implacement and retrieval apparatus having a velocity sensitive safety valve mechanism, constructed according to this invention, connected to the lower extremity thereof.

Figure 3A:
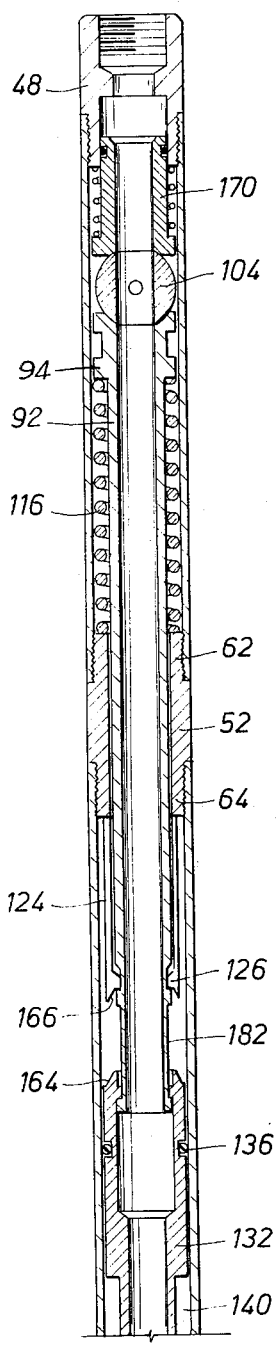

FIG. 3A is a sectional view of the upper portion of a velocity sensitive safety valve mechanism constructed in accordance with the present invention and illustrating the valve part thereof in the open or "production mode".

Figure 3B:
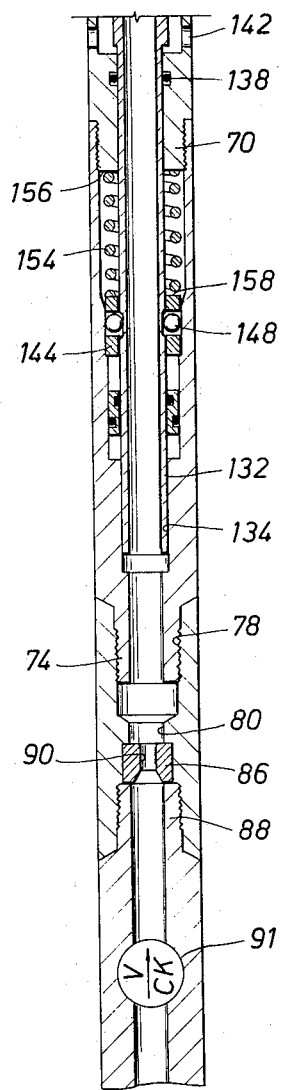

FIG. 3B is a sectional view of the lower portion of the safety valve mechanism of FIG. 3A.

Figure 4A:
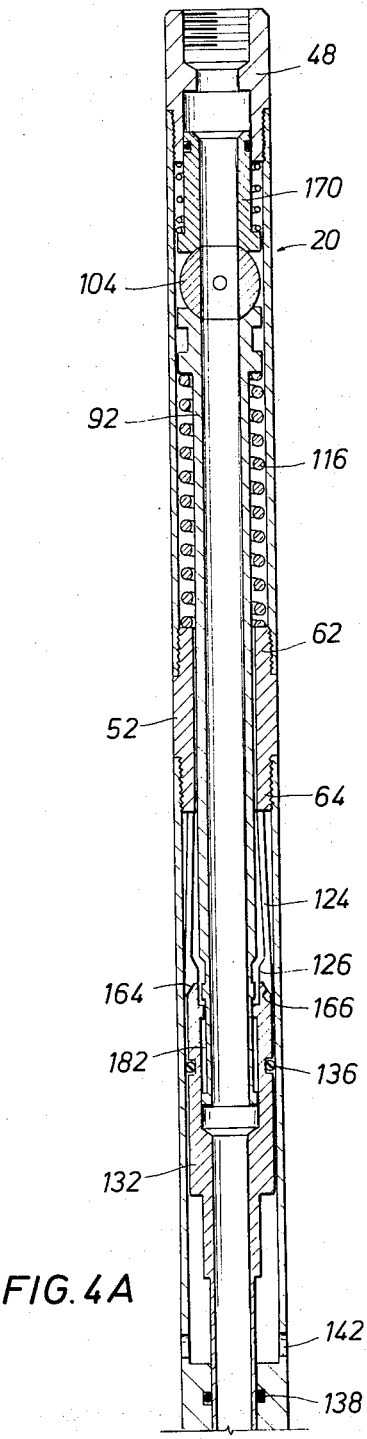

FIG. 4A is a sectional view of the upper portion of the velocity sensitive safety valve mechanism of FIG. 3A illustrating the unlatched position of the actuator sleeve latching mechanism.

FIG. 4B is a sectional view of the lower portion of the velocity sensitive safety valve mechanism of FIG. 4A.

FIG. 5 is a partial sectional view of the velocity sensitive safety valve mechanism of this invention illustrating the closed position of the various valve parts.

FIG. 6A is a sectional view of the upper portion of the velocity sensitive safety valve mechanism of this invention illustrating the parts thereof in detail as such parts are positioned in the open or "production mode" of the safety valve mechanism.

FIG. 6B is a sectional view of an intermediate portion of the safety valve mechanism of the present invention illustrating the various parts thereof in the "production mode".

FIG. 6C is a sectional view of the lower portion of the velocity sensitive safety valve mechanism of the present invention also illustrating the various parts thereof in the "production mode".

FIG. 7 is a fragmentary sectional view of the piston bias latching structure illustrating the unlatched position thereof.

DESCRIPTION OF PREFERRED EMBODIMENT

Now referring to the drawings and first to FIG. 1, an earth formation is illustrated at 10 having a well bore 12 drilled therein which is lined with a well conduit 14 that may be cemented in place in conventional manner. Production tubing 16, typically referred to in the industry as a tubing string, extends through the well casing 14 and is sealed with respect to the well casing by a packer 18 located a convenient distance above the production zone of the earth formation. The tubular conduit 16 is open at its lower extremity to production fluid flowing through performations in the casing 14 and conducts the production fluid upwardly through the tubing string in conventional manner.

For the purpose of shutting off the flow of production fluid through the tubing 16, in the event production flow in the tubing should increase abnormally, it will be desirable to provide a safety valve mechanism that is responsive to predetermined increase in the flow of production fluid to close and effectively shut off the flow of fluid. According to the present invention, such safety valve mechanism may conveniently take the form illustrated in the drawings where a velocity sensitive safety valve mechanism is depicted generally at 20 that may be installed and removed by conventional wire-line equipment, illustrated generally at 22. It will be convenient to install the safety valve within the tubing string at a level where the temperature is high enough to prevent solidification of paraffin which might otherwise cause fouling of the movable valve parts.

With reference now to FIG. 2, the wire-line apparatus 22 is shown to include a landing nipple 24 that may be provided with externally threaded extensions 25 and 26 that receive internally threaded extremities of the production tubing 16. An annular landing shoulder 28 may be defined within the lower extension 26 of landing nipple 24 for engagement by an annular shoulder 30 formed on a wire-line tool 32 thereby preventing the wire-line tool from descending below the level established by annular shoulder 28. Wire-line tool 32 may be provided with locking detents 34 adapted to be received within an annular locking groove 36 defined within landing nipple 24. Wire-line tool 32 may also be provided with a packing 38 of annular configuration for engagement with the cylindrical surface 40, defining a portion of the receptacle for the wire-line tool. As is typically the case, wire-line tool 32 may also be provided with a fishing neck 42 at the upper extremity thereof that may be engaged by appropriate installation and retrieval apparatus of conventional nature.

While the particular wire-line installation and retrieval apparatus 32 is illustrated in FIG. 2, it is to be understood that the particular configuration illustrated is not intended to limit the present invention it being obvious that any suitable wire-line tool of conventional nature may be employed within the spirit and scope of the present invention. The wire-line tool 32 may be provided with a lower externally threaded extremity 44 adapted for threaded connection to internal threads 46 formed within the upper extremity of an upper connector cap section 48 of the safety valve mechanism 20, thereby effectively supporting the safety valve in depending relation from the wire-line tool 32.

The velocity sensitive safety valve mechanism 20 may include a housing structure defined by a plurality of housing sections including the connector cap section 48, a valve section 50, a latch section 52, a latch release section 54, and a lower connector section 56. The connector cap section 48 may be provided with an externally threaded extension 58 adapted to be received by internal threads 60 defined within the upper extremity of the valve section 50. Latch section 52 may be provided with upper and lower externally threaded extensions 62 and 64, respectively, adapted to threadedly receive the lower internally threaded extremity 66 of the valve section 50 and the upper internally threaded extermity 58 of the latch release section 54. The latch release section 54 may also be provided with an externally threaded lower extension 70 received by internal threads 72 of the lower connector section 56. Each of the various threaded sections utilized to assemble the housing structure may be provided with appropriate sealing elements to prevent the possibility of leakage of fluid through the assembled threads.

The lower connector section 56 may be provided with an externally threaded extension 74 to which may be threadedly connected any one of various suitable devices capable of developing a pressure drop between reservoir or casing pressure externally of the safety valve mechanism and an internal flow passage upstream of the safety valve mechanism to allow reopening of the safety valve as discussed hereinbelow for purposes of the present invention, a device for producing a pressure drop of this nature may conveniently take the form of a "low flow" type safety valve mechanism, of the type set forth in U.S. patent application Ser. No. 138,138, now U.S. Pat. No. 3,724,493, of James W. Kisling III, having disposed therein a choke restriction through which production fluid must flow as a well is produced and having a valve element capable of closing in response to decrease in the flow of production fluid below the operating range. In the alternative, the means for producing a pressure drop may take the form of a choke restriction device and a one way check valve connected into the flow passage structure immediately upstream of the velocity sensitive safety valve mechanism of this invention.

For purposes of simplicity, a choke connector segment 76 is provided with internal threads 78 for threaded connection thereof to the lower threaded extension 74 of lower connector section 56. The choke connector segment 76 is provided with a flow passage 80 having an enlarged portion 82 defining a choke recess having an abutment shoulder 84. A choke element 86 may be disposed within the enlargement 82 and may be maintained in abutment with the annular shoulder 84 by a choke retainer 88. If desired, a section of well tubing may be employed to reain the choke element 86 within the choke recess. The choke element 86, frequently referred to in the industry as a "choke beam", includes a restricted passage or orifice 90 through which production fluid must flow to reach the production passage structure of the safety valve mechanism. A check valve, illustrated schematically at 91, may be employed to control the flow of fluid immediately upstream of the choke element.

As the pressurized production fluid flows through the restriction 90, a condition of pressure drop will occur across the choke element, whereby the flow passage structure immediately upstream of the choke element will be disposed at reservoir or casing pressure while the flow passage structure immediately downstream of the choke 86 will be disposed at a pressure somewhat lower than reservoir pressure. Relative pressure drop, of course, is dependent upon the velocity of fluid flowing from the reservoir through the choke restriction 90.

For the purpose of controlling the flow of production fluid through the safety valve mechanism, a valve device may be provided and in accordance with the present invention may conveniently take the form illustrated in detail in FIG. 6A where a valve actuator sleeve 92 is depicted as being movably disposed within the valve housing. The valve actuator sleeve 92 is provided with an annular enlargement 94 at the upper extremity thereof defining an annular groove 96 within which is retained a valve support element 98 depicted in broken lines having a pair of axial extensions 100 to which the trunnion 102 of a ball valve element 104 is journaled for rotation.

At the upper extremity of the valve actuator sleeve 92, may be provided a valve seat surface 106 adapted for sealing engagement with the spherical working surface 108 of the valve ball 104.

For the purpose of imparting rotation to the valve ball 104 from the open position, illustrated in FIGS. 3A, 4A and 6A, to the closed position, illustrated in FIG. 5, the valve ball may include an arcuate groove, illustrated in broken line at 112, cooperating with a pin 114, carried by the housing section 50, that is received within the groove 112. As the sleeve 92 moves linearly, the pin 114 engages the arcuate cam surface, defined by the groove 112, and cams the ball rotatably about the trunnion 102.

To achieve actuation of the valve member 104 to its closed position, a compression spring 116 may be interposed between annular shoulders 118 and 120, defined respectively by the enlargement 94 and the upper extremity of latch section 52. Since shoulder 12 is immovable, being a part of the valve housing, the compression spring 116 will bias the valve actuator sleeve in the direction of flow through the valve. This feature allows the valve element to be closed by a designed bias that is relatively unaffected by the forces introduced by flowing production fluid.

To prevent the valve actuator sleeve 92 from being moved to a position closing the valve element 104, it is desirable to provide a latching device having the capability of locking the valve actuator sleeve in a position maintaining the valve element in the open position thereof with the valve port or flow passage 110 disposed in aligned communication with a flow passage 122 defined by the tubular valve actuating sleeve 92. According to the present invention, a latching mechanism for restraining movement of the valve actuating sleeve 92 may conveniently take the form illustrated in detail in FIG. 6B where the latch section 50 of the housing is illustrated as being provided with a plurality of spring fingers 124, each having a latching detent 126 formed adjacent to the lower extremity thereof and adapted to be received within an annular detent groove 128 formed in the outer periphery of valve actuating sleeve 92 and defining a latching shoulder 130. The latching shoulder 130 is engaged by the detents 126 thereby locking the valve actuating sleeve 92 against movement by the compression spring 116.

After the detents 126 of the spring fingers 124 have engaged the shoulder 130 and locked the valve actuating sleeve against movement, it will be appropriate to unlatch the latching mechanism in the vent flow of production fluid through the aligned flow passage 122 and 110 of the sleeve and ball respectively should become abnormally high. According to the present invention, a velocity sensitive latch releasing mechanism may conveniently take the form illustrated particularly in FIGS. 6B and 6C where a latch releasing piston 132 is depicted in the inoperative position thereof. The latch released piston may comprise an elongated sleeve element having a flow passage 134, disposed influid communication with the flow passage 122 of the valve actuators sleeve 92. Dynamic sealing elements, carried by the latch releasing piston and the housing, as illustrated at 136 and 138, establish spaced seals between the piston and housing thereby defining a piston actuation chamber 140. The piston actuation chamber is disposed in fluid communication with reservoir or casing pressure externally of the safety valve mechanism through a plurality of ports 142 formed through the wall structure of latch release section 54 of the valve housing. Reservoir or casing pressure therefore acts upon one side of the latch releasing piston 132 while a lower pressure, as determined by pressure drop across the choke 86, acts upon the iston 132 in opposition to the forces generated by reservoir pressure, thereby producing a resultant force acting upon the piston 132 tending to drive the piston in an upward direction as long as reservoir pressure is in excess of pressure within the flow passage structure of the safety valve mechanism.

It will be appropriate, therefore, to provide a means for restraining movement of the latch releasing piston as long as the velocity of production fluid flowing through the valve flow passages is within an operating range and which is responsive to excessive flow velocity to allow movement of the latch releasing piston to a latch releasing position. According to the present invention, such restraining means may conveniently take the form illustrated particularly in FIGS. 6C and 7 where a detent retainer ring 144 is shown to be interposed within an annular chamber defined between the lower extremity of the latch releasing piston and the connector section 56 of the valve housing. The latch releasing piston is provided with a plurality of detent apertures 146 within which are disposed detent members 148 that may be of spherical configuration. In the latched or restrained position of the latch releasing piston 32, the detents 148 will be forced by a cylindrical surface 150 into a detent groove 152 thereby locking the detent retainer and detents in assembly with the latch releasing piston. For the purpose of providing restraint for the latch releasing piston, a compression spring 154 is interposed between annular shoulder 156 and 158 defined, respectively, by the lower extremity of latch release section 54 and the upper surface of the detent retainer ring 144. The compression spring 154 biases the detent retainer and detents downwardly and, through the connection between the detents and the detent groove 52, biases the latch releasing piston 132 downwardly, thereby overcoming the forces imparted to the latch releasing piston by reservoir pressure as long as the velocity of flowing production fluid through the flow passages of the valve is below a maximum operating level. The compression rate of spring 154 as well as that of spring 116 are variables that control the flow rate at which the valve closes and the injected pressure at which the valve is reopened.

In the event the flow of pressurized production fluid should increase to an abnormally high level within the safety valve mechanism, such as might occur if a surface control valve is suddenly opened, an abnormally high pressure drop across choke 86 will be suddenly developed, thereby suddenly developing abnormally low pressure within the flow passages of the safety valve downstream of the choke. The abnormally low pressure within the safety valve mechanism defines a substantial pressure differential, compared with reservoir pressure, and creates a greater resultant force acting upwardly upon the latch releasing piston. Whent e ressure drop across the choke 86 indicates excessive flor through the restricted orifice 90 of the choke, the resultant force, cting upwardly upon the latch releasing piston 132, will be sufficient to move the latch releasing piston upwardly against the bias of compression spring 154. When this occurs, the detent retainer ring 144 and detents 148 will be moved upwardly by a cam surface 160, defined by the detent groove 52, against which the detents are forced by the compression spring 154.

With reference now particularly to FIG. 7, as the detnet retainer 144 and detents 148 move upwardly a sufficient amount to clear a cam surface 162, defined within the connector section 56 of the housing, the cam surface 160 will force the detent members 148 radially outwardly thereby extracting the detents from the detent groove 162 and releasing the latch releasing piston 132 from the bias of compression spring 154 during further upward movement of the latch releasing piston.

As the latch releasing piston reaches the upper extremity of its upward travel, a cam surface 164, defined by a retainer member 184 threadedly secured to the piston 132, will move into camming engagement with a plurality of opposing cam surfaces 166, defined at the lower extremity of each of the spring fingers 124. The cam surface 164 will urge the spring fingers 124 radially outwardly thereby extracting the detents 126 of the spring fingers from engagement with the annular shoulder 130 of the valve actuator sleeve 192 and releasing the valve actuator sleeve for movement under bias of the compression spring 116 to a position achieving closure of the valve ball element 104.

After the production flow system has been rendered safe, eliminating the possibility of excessive flow of production fluid, it will be desirable to impart movement to the valve element from its closed position, illustrated in FIG. 5, to the open position thereof. To accomplish opening movement of the valve element, it may be convenient to provide a valve opening actuator piston 170 that is movably disposed within the valve housing and includes a sealing element 172, establishing a dynamic seal between the piston 170 and a cylindrical surface 174, defined internally of the connector cap 48. A compression spring 174, interposed between a shoulder 176, defined by the lower extremity of connector cap 48 and a shoulder 178, defined by the piston 170, serves to force the piston 170 downwardly, maintaining sealing engagement between the working surface 108 of valve element 104 and a seat surface 180 defined at the lower extremity of piston 170.

With the valve element 104 in its closed position, fluid pressure injected from above the valve element will act upon the working surface 108 of the valve ball and upon the surface area presented by the upper portion of the piston 170. The force created by injected pressure against the valve ball and piston, coupled with the bias of compression spring 174, will urge the valve ball and the valve actuator sleeve 92 downwardly against the bias of compression spring 116. Downward movement of the valve ball 104, relative to the pin 114, will cause camming action between pin 114 and the arcuate groove 112 of the valve ball, thereby achieving opening of the valve ball sufficiently to allow fluid pressure to bypass the ball and flow into the flow passages of the safety valve and into the annulus defined between the valve actuator sleeve and the housing. Since the check valve 91 allows the flow of production fluid but prevents injected pressure from flowing past the check valve, the injected pressure will be allowed to increase until a pressure differential is developed across the latch releasing piston that is of sufficient magnitude to urege the latch releasing piston toward the latched position thereof. The lower valve must be closed for a $\Delta$ P to be developed across the piston. It should be noted that movement of the latch releasing piston ownwardly under the action of injected pressure will not involve the bias of compression spring 154 since the detents 148 will be disposed in the FIG. 7 condition thereof.

For the purpose of inducing further movement of the valve actuator sleeve toward a position fully opening the ball valve element, a lost-motion connection is established between the valve actuator sleeve and the latch releasing piston 132 by a split-ring that is received about a reduced diameter surface 182, defined in the lower outer periphery of the valve actuating sleeve. The split-ring connector 180 is maintained in assembly with the latch releasing piston 132 by a retainer ring 184 threadedly received at the upper extremity of the latch releasing piston.

The reduced diameter surface 182 defines annular shoulders 186 and 188 that are engaged by the split-ring connector 180 at each extremity of its travel along cylindrical surface 182. Shoulders 186 and 188 therefore define an area of lost-motion between the valve actuating sleeve 92 and the latch releasing piston 132.

As movement of the latch releasing piston 132 is continued by injected pressure, the split-ring conne tor 180 will engage the annular shoulder 188 thereby causing the latch releasing piston to retract valve actuator sleeve 92 against the bias of compression spring 116. As valve actuator sleeve 92 is moved, by the piston 132, to a position causing full opening of the valve ball 104, the spring fingers 122 will cause detents 126 to move into the detent groove 18 for locking engagement with the annular shoulder 130. The valve actuator sleeve will be allowed to move upwardly from this position only upon release of the detents 126 from the shoulder 130 by the cam 164 as the latch releasing piston 132 is again moved upwardly by a pressure differential developed by excessive flow.

As the latch releasing piston 132 is moved downwardly to the position thereof as illustrated in FIG. 6B and 6C, the detents 148 will become aligned with the detent groove 152. Since a downward force is being exerted by the compression spring 154, the annular shoulder 162 on connector section 66 of he housing will force the detents radially inwardly into the detent groove. When this occurs the piston 132, the detent retainer 154 and the detents move downwardly until the piston has reached the full extent of its downward travel.

As injected pressure is dissipated to again allow the flow of production fluid through the safety valve mechanism, reservoir pressure acting thorugh apertures 142 into piston actuating chamber 140 will again introduce a bias tending to force the piston 140 upwardly toward the latch releasing position thereof. Since the detents will have become locked within the detent groove 152, the latch releasing piston again will be subject to the bias of compression spring 154, which opposes the resultant force acting upwardly against the piston 132. Since at this time the flow through the restricted orifice 90 of choke 86 will be low and insignificant pressure drop will exist across the choke 86, pressure will be maintained with the flow passages of he safety valve at a sufficiently high level to maintain the resultant force acting upwardly against piston 132 at a relatively low level. The piston 132 under this condition will be unable to move upwardly against the bias of spring 154 a sufficient amount to release the detent mechanism 148, 152. The safety valve will therefore be maintained in the "production mode" thereof, as illustrated in FIGS. 3A and 3B until flow of production fluid within the safety valve flow passages should subsequently increase to an abnormally high level and again cause the latch releasing piston to be moved upwardly to the latch releasing position thereof, as illustrated in FIG. 4A.

OPERATION

Assuming the safety valve mechanism, illustrated in the drawings, to be maintained in the "production mode" thereof, as illustrated in FIGS. 3A and 3B, the valve element 104 will be in its open position with the flow passage 110 thereof in communication with the flow passage 122 of valve actuating sleeve 92 and flow passage 134 of the latch releasing piston 132. Production fluid fromthe casing or reservoir will flow upwardly through the choke restriction 90, causing a pressure drop across the choke 86 which causes a reduced pressure to exit within the safety valve flow passages. The reduced pressure is of sufficient magnitude to prevent the development of a resultant force, acting upwardly upon the latch releasing piston 132, of sufficient magnitude to overcome the bias of compression spring 154 and release the latch mechanism 148.

In the event flow through the safety valve mechanism should reach an excessive level, which, for example, may be caused by sudden opening of a surface valve of the well flow system, fluid flowing through the restriction 90 will develop a substantial pressure drop across choke 86 thereby reducing pressure within the flow passage of the valve below the level desired for normal production. When this occurs, the forces created by low pressure within the flow passages of the safety valve, acting downwardly upon the latch releasing piston, will be insufficient and the resultant force acting upwardly on piston 132, created by reservoir pressure acting through ports 142 within chamber 140, will urge the latch releasing piston upwardly overcoming the bias of compression spring 154.

Upon movement of the latch releasing piston to the FIG. 7 position thereof, the shoulder 160 will cam the detent members 148 radially outwardly thereby releasing connection between the latch releasing piston and the ball detents and releasing the piston 132 for free movement upwardly under the resultant force acting upwardly upon the piston. When the latch releasing piston 132 has been released from the bias on spring 154, it will move rapidly upwardly causing the cam surface 164 to engage cam surfaces 166 of the spring fingers 154, thereby urging the spring fingers radially outwardly and disengaging the detents 124 from annular shoulder 130. When this has occurred, the valve actuator sleeve 192 will be released from its locked condition and compression spring 116 will urge the valve actuating sleeve upwardly causing rotation of the valve ball 104 to the closed position thereof. As the valve ball is moved upwardly, and is rotated to its closed position, the valve opening piston 170 will be moved upwardly against the bias of its compression spring 154. The safety valve mechanism will be closed, ceasing the flow of production fluid.

Opening of the safety valve mechanism to again resume the flow of production fluid may be accomplished only by injection of fluid pressure into the tubing string above the closed valve ball element 104. As opening fluid pressure is injected from above the valve element, such as by connecting the tubing string with a source of auxially pressure, the injected pressure will act upon the working surface of closed valve ball 104 and will also act upon the upwardly facing transverse surface area of piston 170, thereby cooperating with the bias of compression spring 174 to urge the valve ball downwardly, causing the pin and arcuate cam groove of the valve ball to partially open the valve ball and allow flow of injected fluid into the flow passages of the safety valve and into the annulus defined between the valve actuator sleeve and the wall of the valve housing.

When this occurs the injected pressure will be communicated downwardly and will come to bear upon the upper surface area of latch releasing piston 132 thereby urging the latch releasing piston downwardly. After the latch releasing piston has moved downwardly a sufficient amount to cause engagement between the split-ring connector 180 and the annular shoulder 188, the latch releasing piston will impart downward movement to the valve actuator sleeve 92 against the bias of compression spring 116. The valve actuator sleeve may be moved downwardly a sufficient amount to cause the detents 126 of spring fingers 124 to engage the shoulder 130, thereby locking the valve actuator sleeve against subsequent upward movement when injection pressure is reduced. AS explained above, the detents 148 again will be received within detent groove 152 thereby causing the latch releasing piston 132 to again be subject to the bias of compression spring 154. The safety valve mechanism will again be disposed in its "production mode".

Flow of production fluid may be established simply by reducing the injected pressure, such as by controlled opening of a surface control valve. The flow of production fluid through the safety valve mechanism will be allowed as long as the velocity of the flowing fluid remains within the operating range.

The safety valve system may be simply and inexpensively tested by opening surface flow control valves until the designed flow rate is reached for valve actuation. If the safety valve fails to actuate within a particular flow velocity range, it is immediately recognized that the valve is in need of servicing. By using the wire line installation and removal technique, discussed above, the valve may be retrieved and repaired or simply replaced. Down time on the flow system can be maintained at an optimum low level.

It will be evident from the foregoing that I have provided a novel velocity sensitive safety valve mechanism that is capable of functioning properly in a downhole well environment as well as in other appropriate environments to shut off the flow or production fluid in the vent the velocity of the production fluid should increase for any eason whatever above a predetermined maximum operating level. The safety valve mechanism of my invention may be simply and effectively tested to insure proper operation thereof without necessitating an expensive tesint operation and without requiring removal of a production tubing from the well. The testing procedure may be initiated simply by full opening of the surface control valve thereby allowing flow within the safety valve mechanism to increase to an abnormally high level. After the valve has functioned properly by closing responsive to excessive velocity of the production fluid, it may again be reopened for resumption of normal production flow simply by introducing into the tubing string, above the valve mechanism, a pressure that may be in excess of reservoir pressure. After the valve has again been opened, production flow may be resumed simply by opening surface control valve to a level achieving normal flow.

In the event a testing procedure should indicate the safety valve to require servicing or replacement, such can be accomplished without necessitating removal of the tubing string from the well. Since the safety valve mechanism may be connected to conventional wireline equipment, it may be retrieved and replaced by a wire-line tool in obvious manner.

To achieve full range flow production for a flow sytem of a well, the velocity sensitive safety valve mechanism of this invention may be connected immediately above a low flow safety valve mechanism, thereby lending safety valve capability under virtually all possible pressure and flow conditions that might develop at the surface or within the reservoir being produced. It is therefore seen that the present invention is one well adapted to attain all of the objects and advantages hereinabove set forth together with other advantages which will become obvious and inherent from a description of the apparatus itself. It will be understood that certain combinations and subcombinations are of utility and may be employed without reference to other features and other subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in a limiting sense.

I claim:

1. A velocity sensitive, safety valve mechanism comprising:
   housing means;
   valve means disposed within said housing means and being movable between open and closed positions;
   valve actuating means being disposed for linear movement within said housing means and being operatively connected to said valve means, said valve actuating means imparting opening and closing movement to said valve means upon being moved linearly within said housing means, said valve actuating means defining latch detent means and valve opening connection means;
   means urging said valve actuating means toward a position thereof causing closure of said valve means;
   latch means carried by said housing means and engaging said latch detent means for maintaining said valve means in the open position thereof, said latch means being releasable to allow closure of said valve means by said biasing means;
   restriction means disposed upstream of said valve actuating means, and creating a pressure differential between fluid pressure exteriorly of said housing and fluid pressure interiorly of said housing; and
   piston means being disposed for linear movement within said housing means downstream of said restriction means, said piston means being responsive to predetermined pressure differential for engaging said latch means and releasing said latch means from said detent means.

2. A velocity sensitive safety valve mechanism as recited in claim 1:
   means for imparting initial movement to said valve means to open the same responsive to application of fluid pressure within said housing in excess of fluid pressure exteriorly of said housing; and
   said piston means imparting movement to said valve means from said initially moved position to the fully open position responsive to application of fluid pressure within said hosing in excess of fluid pressure exteriorly of said housing.

3. A velocity sensitive safety valve mechanism as recited in claim 1:
   said piston means having a latching groove defined therein;
   said means restraining movement of said piston means from said urging means for free movement in response to predetermined velocity of fluid flowing through said valve mechanism being a ball detent latch movably disposed within said housing and being releasably engagable within said latching groove; and a compression spring urging said ball detent latch in a direction opposing the flow of fluid through said valve mechanism.

4. A velocity sensitive safety valve mechanism as recited in claim 3:
   said latching groove defining detent shoulder means on said piston means;

a retainer ring being movably disposed within said housing means and about said piston means;

ball detent means being carried by said detent ring and being disposed for releasable engagement with said detent shoulder means;

said compression spring being interposed between said housing and said retainer ring; and upon predetermined movement of said piston means responsive to predetermined pressure differential said detent means disengaging from said detent shoulder means tehreby releasing said piston means for free movement within said housing.

5. A velocity sensitive safety valve mechanism as recited in claim 1:

means urging said piston means in a direction opposing movement thereof into engaging relation with said latch means; and means releasing said piston means from said urging means upon development of a predetermined pressure differential across said restriction means.

6. A velocity sensitive safety valve mechanism as recited in claim 1:

a ball detent mechanism being movably disposed within said housing means;

said piston means being adapted to releasable connection with said ball detent mechanism; and urging means being interposed between said ball detent mechanism and said housing and causing said ball detent mechanism to restrain unlatching movement of said piston means until the force acting on said piston reaches a predetermined magnitude.

7. A velocity sensitive safety valve as recited in claim 6 said piston means having lost-motion connection with said valve actuator means and being responsive to injected pressure for imparting valve opening movement to said valve actuating means against the bais of said urging means.

8. A velocity sensitive safety valve mechanism comprising:

housing means being adapted for connection with production conduit means;

a valve actuator sleeve being movably disposed within said housing means and having a latching groove defined thereon;

a valve element being carried by said valve actuator sleeve and being movable between open and closed positions responsive to linear movement of said valve actuating sleeve; 31 a compression spring interposed between said housing and said actuator sleeve and biasing said valve actuator sleeve in a direction causing closing of said valve element;

spring latching finger means being carried by said housing means and engaging within said latching groove and locking said valve actuator sleeve in a position where said valve element is maintained in the open position thereof;

a latch releasing piston being movably disposed within said housing and being movable by differential pressure interiorly and exteriorly of said housing;

a restriction means disposed upstream of said piston and creating a pressure differential between fluid pressure interiorly and exteriorly of said housing responsive to fluid flowing through said valve mechanism;

said latch releasing piston, upon full movement in one direction, releasing engagement between said latch means and said valve actuating sleeve and upon movement in the opposite direction, engaging and moving said valbe actuating sleeve in a direction imparting movement said valve element toward the open position thereof; and means restraining movement of said piston means in said one direction and releasing said piston for free movement in response to predetermined movement of said piston in said one direction.

9. A velocity sensitive safety valve mechanism as recited in claim 8, including:

means for imparting initial movement of said valve actuating sleeve toward the direction causing opening of said valve element.

10. A velocity sensitive safety valve mechanism as recited in claim 8:

said valve element being a ball valved; and said housing having means engaging said ball valve and imparting rotation to the same between open and closed positions in response to linear movement of said valve actuating sleeve and said ball valve.

11. A velocity sensitive safety valve mechanism as recited in claim 14:

said latch releasing piston comprising an elongated element having a flow passage defined therethrough;

means defining spaced dynamic seals between said piston and said housing and defining a piston actuating chamber;

means communicating said piston actuating chamber with fluid pressure exteriorly of said housing; and fluid pressure internally and externally of said piston ctuation chamber developing a resultant force imparting movement to said piston.

12. A velocity sensitive safety valve mechanism as recited in claim 11:

said latch releasing piston having a lost motion connection with said valve actuating sleeve whereby limited relative linear movement is allowed therebetween.

13. A velocity sensitive safety valve mechanism as recited in claim 12:

said means restraining movement of said piston means in said one direction and releasing said piston for free movement comprising a bias connector shoulder defined on said piston means;

a detent retainer member being disposed between said piston means and said housing;

a plurality of detent apertures formed in said detent retainer member;

a plurality of detent members being retained within said detent apertures and being received in engagement with said bias connector shoulder; and means interposed between said housing and said detent retainer member and imparting a bias thereto.

14. A velocity sensitive safety valve mechanism as recited in claim 13:

said restriction means being disposed upstream of said valve element;

said restriction means being in fluid communication with fluid pressure exteriorly of said housing; and restriction means being disposed within said flow passage means and being responsive to the flow of fluid to develop a pressure drop across said restriction.

15. A safety valve apparatus adapted for installation in the production string of a well producing a fluid under well pressure, comprising:
an inner member movable axially within an outer member, said members defining a passage for the flow of production fluids;
valve means actuated by movement of said inner member in one axial direction for closing said flow passage and by movement of said inner member in the other axial direction for opening said flow passage;
a compressible medium reacting against said outer member and said inner member and continuously urging said inner member in said one direction;
releasable means normally preventing movement of said inner member in said one direction for maintaining said valve means in the open position; and
hydraulically operable means movable in both of said axial directions relative to said outer member, movement of said hydraulically operable means in said one axial direction functioning to release said releasable means to enable said urging means to shift said inner member in said one direction to close said valve means, movement of said hydraulically operable means in said other axial direction functioning to shift said inner member in said opposite direction to open said valve means.

16. A safety valve apparatus as recited in claim 15, wherein:
said hydraulically operable means includes a transverse pressure area with one side subject to the pressure of fluids in said passage and the opposite side subject to the pressure of the production fluids in a well, and further including means for restricting the flow of fluids through said passage in a manner to develop a pressure differential of magnitude proportional to the velocity of the flow of said fluids, the lesser pressure acting on said one side of said pressure area to produce a force tending to cause movement in said one direction.

17. A safety valve apparatus as recited in claim 16, including:
means for yieldably resisting movement of said hydraulically operable means in said one direction with a reaction force that is proportional to the amount of such movement, said hydraulically operable means being normally spaced axially away from said releasable means until a pressure drop of a predetermined magnitude has been developed by said restricting means.

18. A safety valve apparatus as recited in claim 17, wherein:
lost-motion coupling means is provided between said hydraulically operable means and said inner member to enable relative movement during and subsequent to release of said releasable means, said coupling means including opposed transverse shoulders that are engageable to cause shifting of said inner member in said other direction to open said valve means.

19. A safety valve apparatus as recited in claim 17, wherein:
said resisting means includes a coil spring having one end engaging said outer member, laterally movable means for coupling the other end of said spring to said hydraulically operable means, and means for releasing said coupling means only after a predetermined amount of movement of said hydraulically operable means in said one direction, said movement causing a corresponding amount of deflection of said spring.

* * * * *